United States Patent
Takemura

(10) Patent No.: US 10,899,482 B2
(45) Date of Patent: Jan. 26, 2021

(54) STORAGE BAG AND PAPER-SHEET PROCESSING DEVICE

(71) Applicant: GLORY LTD., Hyogo (JP)

(72) Inventor: Yoichi Takemura, Hyogo (JP)

(73) Assignee: GLORY, LTD., Hyogo (JP)

( * ) Notice: Subject to any disclaimer, the term of this patent is extended or adjusted under 35 U.S.C. 154(b) by 57 days.

(21) Appl. No.: 15/908,847

(22) Filed: Mar. 1, 2018

(65) Prior Publication Data

US 2018/0251244 A1 Sep. 6, 2018

(30) Foreign Application Priority Data

Mar. 1, 2017 (JP) .................................. 2017-038714

(51) Int. Cl.
*B65D 33/14* (2006.01)
*B65B 7/02* (2006.01)
(Continued)

(52) U.S. Cl.
CPC ................ *B65B 7/02* (2013.01); *B65B 25/14* (2013.01); *B65B 51/146* (2013.01); *B65D 33/02* (2013.01);
(Continued)

(58) Field of Classification Search
CPC ............. G07D 11/0087; G07D 11/009; G07D 11/0096; G07D 11/12; G07D 11/125; B65D 33/007; B65D 33/02; B65D 33/14
(Continued)

(56) References Cited

U.S. PATENT DOCUMENTS 9,754,436 B1 * 9/2017 Drasinover .......... G07D 11/009
2009/0266036 A1 * 10/2009 Zerfas ..................... B65B 9/042
53/469

(Continued)

FOREIGN PATENT DOCUMENTS

EP 2736025 A1 5/2014
EP 2774868 A1 9/2014
(Continued)

OTHER PUBLICATIONS

JP2013141995Translation (Year: 2013).*
Extended European Search Report for 18158152.1 dated Jun. 6, 2018.

*Primary Examiner* — Jes F Pascua
*Assistant Examiner* — Nina K Attel
(74) *Attorney, Agent, or Firm* — Brundidge & Stanger, P.C.

(57) ABSTRACT

A storage bag which includes an opening is to be suspended from a first holding section and a second holding section of a paper-sheet processing device. The storage bag includes a first attaching portion to be attached to the first holding section, and provided at an opening end of the storage bag, a second attaching portion to be attached to the second holding section, and provided at the opening end of the storage bag, a first sealing portion which is provided at a position below the first attaching portion, a second sealing portion which is provided at a position below the second attaching portion and which seals the opening by being joined with the first sealing portion, and a reinforcing member provided in either one of the first sealing portion and the second sealing portion.

19 Claims, 10 Drawing Sheets

(51) Int. Cl.
  *G07D 11/17*   (2019.01)
  *B65D 33/02*   (2006.01)
  *G07F 19/00*   (2006.01)
  *G07F 11/64*   (2006.01)
  *G07F 17/42*   (2006.01)
  *G07D 11/12*   (2019.01)
  *G07D 11/16*   (2019.01)
  *B65B 25/14*   (2006.01)
  *B65B 51/14*   (2006.01)
  *G07D 11/00*   (2019.01)
  *B65D 33/00*   (2006.01)
  *B65B 5/06*    (2006.01)

(52) U.S. Cl.
  CPC ........... *B65D 33/14* (2013.01); *G07D 11/009* (2013.01); *G07D 11/12* (2019.01); *G07D 11/16* (2019.01); *G07D 11/17* (2019.01); *G07F 11/64* (2013.01); *G07F 17/42* (2013.01); *G07F 19/201* (2013.01); *B65B 5/067* (2013.01); *B65D 33/007* (2013.01); *B65H 2701/1912* (2013.01)

(58) Field of Classification Search
  USPC ......... 53/564, 570, 384.1; 383/9, 22, 24, 33, 383/34; 248/95, 97, 99, 100; 220/908.1, 220/495.01, 495.06, 495.08, 495.1
  See application file for complete search history.

(56) References Cited

U.S. PATENT DOCUMENTS

| | | |
|---|---|---|
| 2013/0334768 A1 | 12/2013 | Hashimoto |
| 2018/0029730 A1 | 2/2018 | Yokoo et al. |
| 2018/0033228 A1 | 2/2018 | Akagi et al. |

FOREIGN PATENT DOCUMENTS

| | | | |
|---|---|---|---|
| GB | 2394939 A | | 5/2004 |
| JP | 2012174134 A | | 9/2012 |
| JP | 2013141995 | * | 7/2013 |
| JP | 2016-145065 A | | 8/2016 |
| WO | 2016/136517 A1 | | 9/2016 |

* cited by examiner

STORAGE BAG AND PAPER-SHEET PROCESSING DEVICE

TECHNICAL FIELD

The present invention relates to a storage bag and a paper-sheet processing device.

BACKGROUND ART

Patent Literature (hereinafter, referred to as PTL) 1 discloses a banknote storing mechanism for storing banknotes inside a storage bag, such as a pouch. PTL 1 describes closing the opening of a storage bag which stores banknotes with a heating member.

CITATION LIST

Patent Literature

PTL 1
WO2016/136517

SUMMARY OF INVENTION

Technical Problem

In a case where a storage bag is made of, for example, a soft and thin material, the opening of the storage bag may be heat welded in a wrinkled state, thereby possibly causing a seal failure of the storage bag.

An object of the present invention is to provide a storage bag and a paper-sheet processing device for preventing a seal failure of a storage bag.

Solution to Problem

A storage bag of the present invention which includes an opening is to be suspended from a first holding section and a second holding section of a paper-sheet processing device. The storage bag includes a first attaching portion to be attached to the first holding section, and provided at an opening end of the storage bag, a second attaching portion to be attached to the second holding section, and provided at a position which is at the opening end of the storage bag and which faces the first attaching portion, a first sealing portion which is provided at a position below the first attaching portion when the storage bag is suspended from the first holding section and the second holding section, a second sealing portion which is provided at a position below the second attaching portion when the storage bag is suspended from the first holding section and the second holding section and which seals the opening by being joined with the first sealing portion, and a reinforcing member provided in either one of the first sealing portion and the second sealing portion.

Advantageous Effects of Invention

The present invention can prevent a seal failure of a storage bag.

DESCRIPTION OF EMBODIMENTS

Hereinafter, embodiments of the present invention will be described with reference to the accompanying drawings.

First Embodiment

Figure 1:
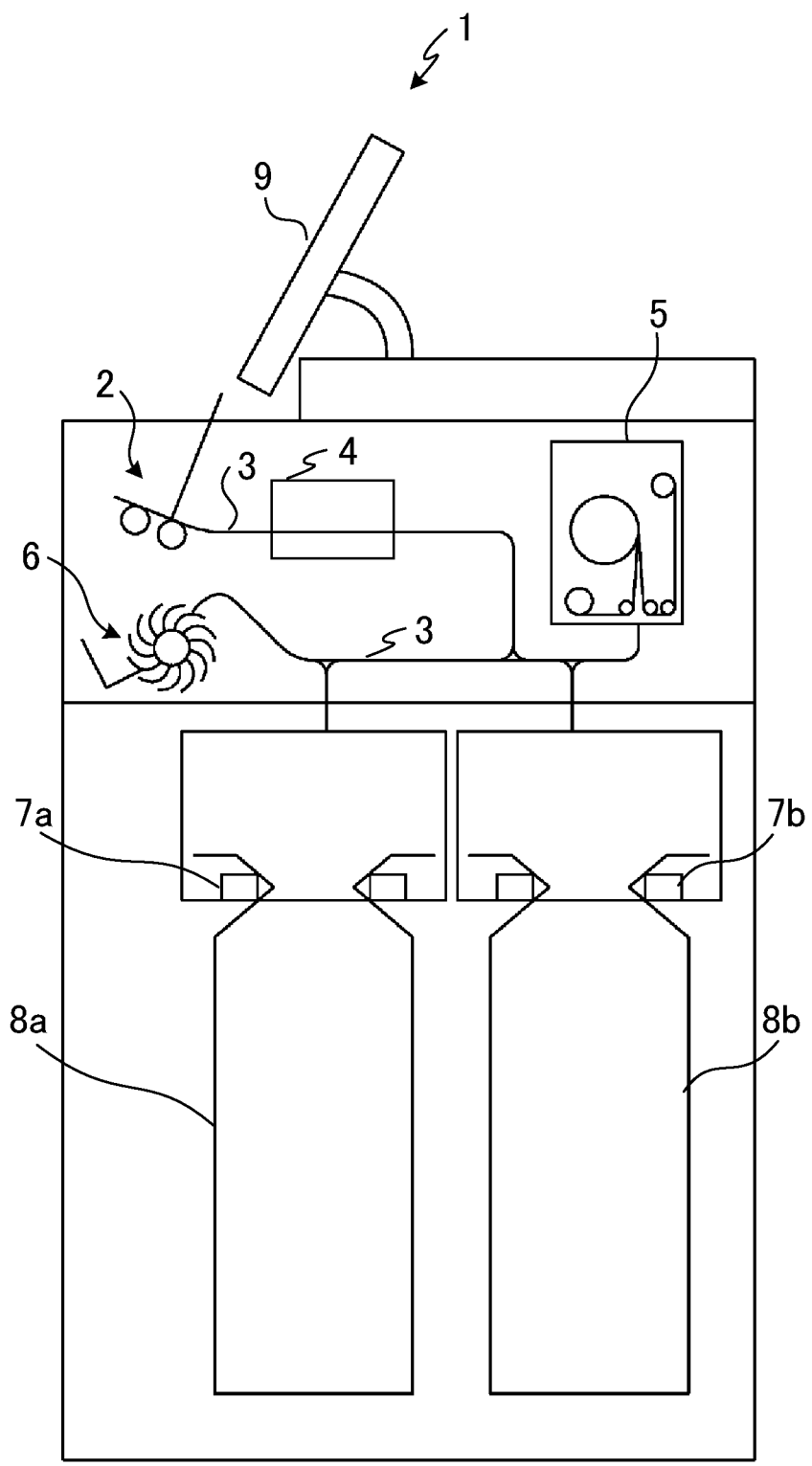
FIG. 1 schematically illustrates a configuration of a paper-sheet processing device in which storage bags according to a first embodiment are in a suspended state.

FIG. 1 schematically illustrates a configuration of a paper-sheet processing device in which storage bags according to the first embodiment are in a suspended state. As illustrated in FIG. 1, paper-sheet processing device 1 includes inlet unit 2, transport unit 3, recognition unit 4, storing/feeding unit 5, dispensing unit 6, storage bag holding units 7a and 7b, and storage bags 8a and 8b, and operation/display unit 9. Paper-sheet processing device 1 illustrated in FIG. 1 is installed in, for example, shops, such as supermarkets, and banks, and performs various processes, such as a money depositing/dispensing process.

Banknotes are input into inlet unit 2 by a user. The input banknotes are fed to transport unit 3 one by one.

Recognition unit 4 is provided in the periphery of transport unit 3, which is downstream from inlet unit 2 and upstream from storing/feeding unit 5, dispensing unit 6, and storage bag holding units 7a and 7b. Recognition unit 4 includes various sensors (not illustrated), and recognizes the denomination, authenticity, face/back, fitness, new/old and the like of banknotes transported by transport unit 3. Each banknote transported by transport unit 3 is transported to any one of storing/feeding unit 5, dispensing unit 6, and storage bags 8a and 8b in accordance with the identification result of recognition unit 4, a user's operation or the like.

Storing/feeding unit 5 includes a so-called winding type banknote-storing/feeding mechanism. Storing/feeding unit 5 stores banknotes transported by transport unit 3, and feeds the banknotes stored therein to transport unit 3.

Banknotes transported from transport unit 3 are accumulated in dispensing unit 6. The user can take out the banknotes accumulated in dispensing unit 6 from the front side of paper-sheet processing device 1.

As described in detail below, from storage bag holding units 7a and 7b, storage bags 8a and 8b are to be suspended, respectively. Storage bags 8a and 8b are suspended with each opening thereof in an opened state from storage bag holding units 7a and 7b. Banknotes transported by transport unit 3 are stored in storage bags 8a and 8b with each opening thereof in an opened state. An example of a mechanism for storing banknotes in storage bags 8a and 8b is disclosed in, for example, WO2016/136517.

Figure 2:
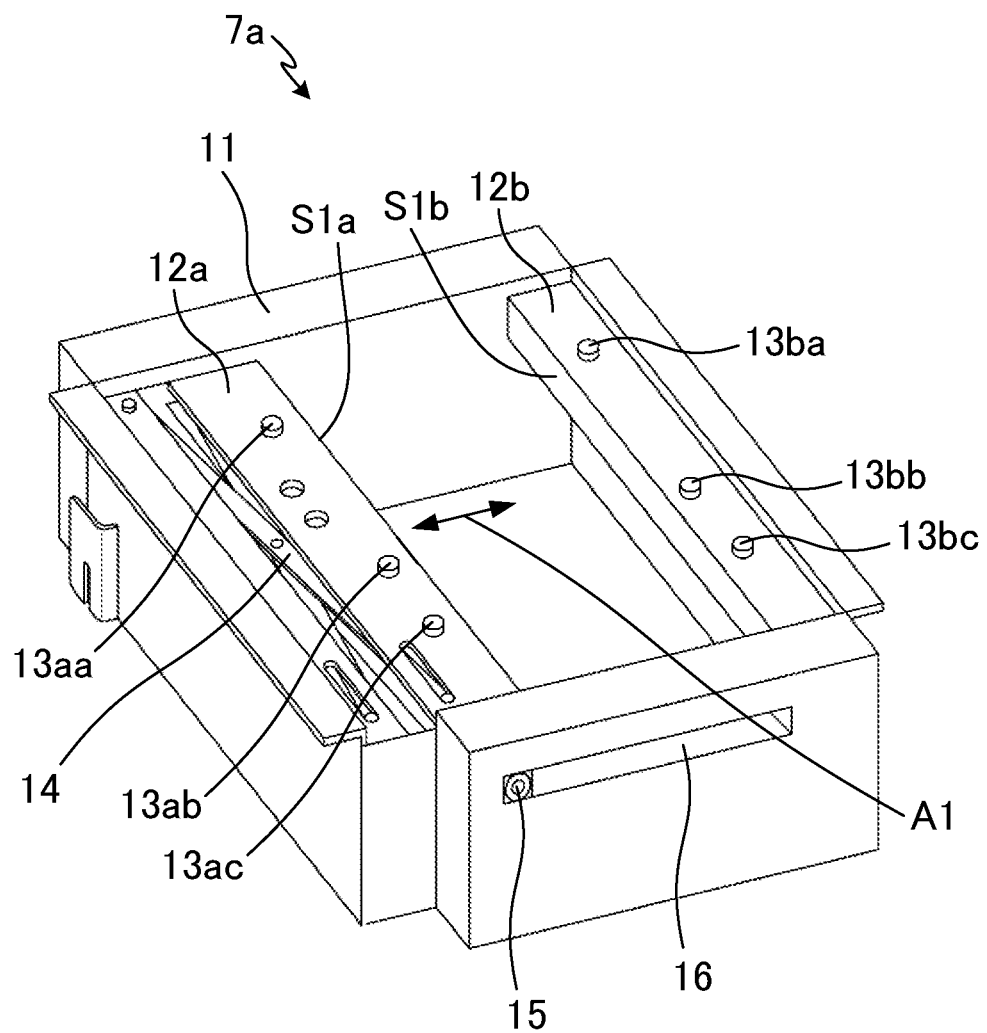
FIG. 2 is a perspective view of a storage bag holding unit.

FIG. 2 is a perspective view of storage bag holding unit 7a. As illustrated in FIG. 2, storage bag holding unit 7a includes frame 11, holding sections 12a and 12b, pins 13aa to 13ac and 13ba to 13bc, pantograph 14, guide pin 15, and slot 16. The description of storage bag holding unit 7b is omitted as it has the same configuration as storage bag holding unit 7a.

Holding sections 12a and 12b are each, for example, a rod-shaped member in a cuboid shape. Holding sections 12a and 12b are provided in substantially box shaped frame 11 so that they are spaced apart to face each other. Holding section 12a is coupled with below-described pantograph 14 which enables holding section 12a to move in double-headed arrow A1 direction (a direction in which holding sections 12a and 12b face each other) illustrated in FIG. 2.

Holding section 12b is fixed to frame 11 of storage bag holding unit 7a. Holding section 12b includes in the inside thereof a heating section, such as a heater, for example. The heating section inside holding section 12b heats surface S1b of holding section 12b. Surface S1b of holding section 12b faces surface S1a of holding section 12a. Surfaces S1a and S1b are, for example, flat surfaces.

Pins 13aa to 13ac are provided on the top surface of holding section 12a. Pins 13ba to 13bc are provided on the top surface of holding section 12b. Pins 13aa to 13ac and 13ba to 13bc respectively engage with holes provided in storage bag 8a (refer to holes 22aa to 22ac and 22ba to 22bc in FIG. 3). Engaging the holes provided in storage bag 8a with pins 13aa to 13ac and 13ba to 13bc enables storage bag 8a to be suspended from storage bag holding unit 7a (refer to FIG. 6).

As for pantograph 14, one end thereof is coupled with frame 11, and the other end thereof is coupled with holding section 12a. Holding section 12a coupled with the other end of pantograph 14 moves in a direction toward holding section 12b by the extension of pantograph 14. Holding section 12a coupled with the other end of pantograph 14, meanwhile, moves in a direction opposite from holding section 12b by the retraction of pantograph 14. Pantograph 14 is extendable until surface S1a of holding section 12a contacts surface S1b of holding section 12b.

Guide pin 15 is provided at the end of holding section 12a in the longitudinal direction thereof. Guide pin 15 is guided to slot 16 provided in frame 11. Slot 16 is formed in frame 11 so that the longitudinal direction of slot 16 is parallel to the direction in which holding sections 12a and 12b face each other. Guiding of guide pin 15 within slot 16 enables holding section 12a having guide pin 15 to move in the double-headed arrow A1 direction illustrated in FIG. 2.

Figure 3:
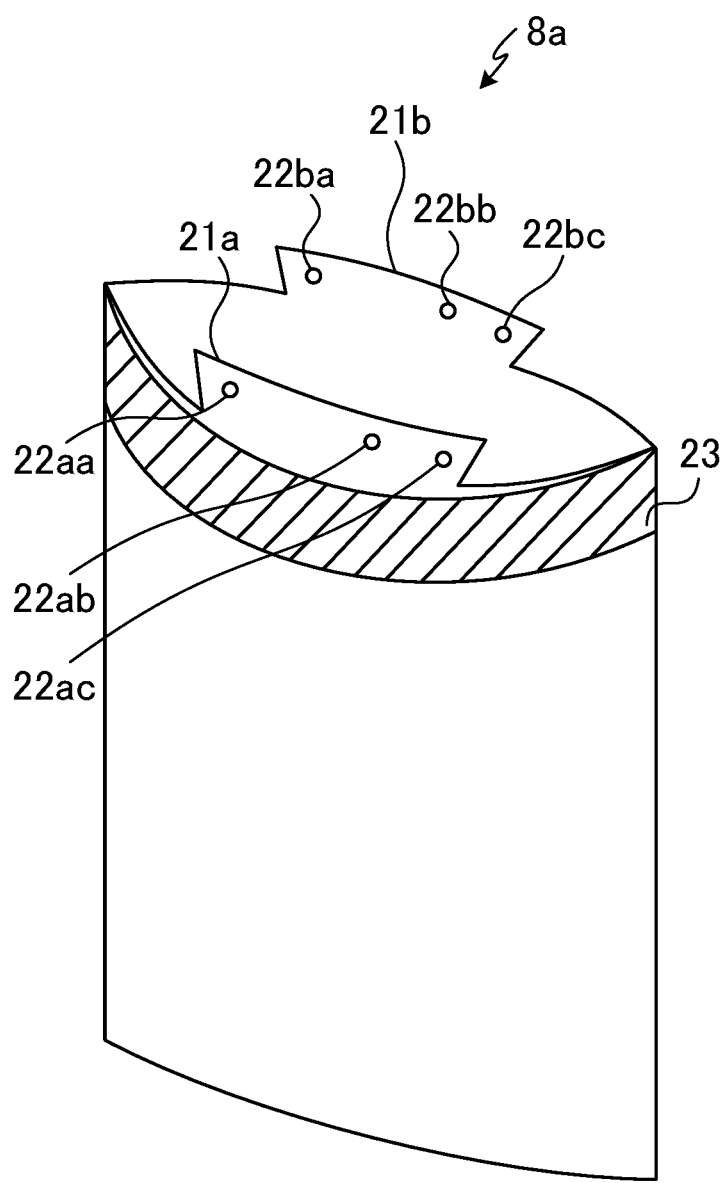
FIG. 3 is a perspective view of a storage bag with the opening thereof in an opened state.

FIG. 3 is a perspective view of storage bag 8a with the opening thereof in an opened state. As illustrated in FIG. 3, storage bag 8a includes attaching portions 21a and 21b, holes 22aa to 22ac and 22ba to 22bc, and reinforcing member 23. The description of storage bag 8b is omitted as it has the same configuration as storage bag 8a.

Storage bag 8a is, for example, made of polyethylene. Storage bag 8a includes an opening at an upper part thereof. Storage bag 8a receives banknotes transported by transport unit 3 from the opening thereof.

Attaching portion 21a is provided at the end and on the opening side of storage bag 8a. Holes 22aa to 22ac are formed in attaching portion 21a. Holes 22aa to 22ac formed in attaching portion 21a are engaged with pins 13aa to 13ac of holding section 12a in storage bag holding unit 7a illustrated in FIG. 2, thereby enabling attachment of attaching portion 21a to holding section 12a in storage bag holding unit 7a illustrated in FIG. 2.

Attaching portion 21b is provided at a position which is at the end and on the opening side of storage bag 8a and which faces attaching portion 21a. Holes 22ba to 22bc are formed in attaching portion 21b. Holes 22ba to 22bc formed in attaching portion 21b are engaged with pins 13ba to 13bc of holding section 12b in storage bag holding unit 7a illustrated in FIG. 2, thereby enabling attachment of attaching portion 21b to holding section 12b in storage bag holding unit 7a illustrated in FIG. 2.

Reinforcing member 23 is a band-shaped or rod-shaped member, and provided below either one of attaching portions 21a and 21b. In FIG. 3, as an example, band-shaped reinforcing member 23 is provided below attaching portion 21a. Reinforcing member 23 is, for example, stiffer than storage bag 8a, and made of polyethyleneterephthalate. In reinforcing member 23 as described below, force is applied so as to prevent wrinkling of the opening of storage bag 8a (refer to FIGS. 9 and 10). Herein, "stiffer" refers to higher rigidity against bending.

Reinforcing member 23 may be limper than storage bag 8a. That is, when reinforcing member 23, i.e., an additional member, is provided (adhered) to storage bag 8a, storage bag 8a becomes stiffer in the periphery of the opening thereof, and thus wrinkling of the opening may be prevented.

Figure 4:
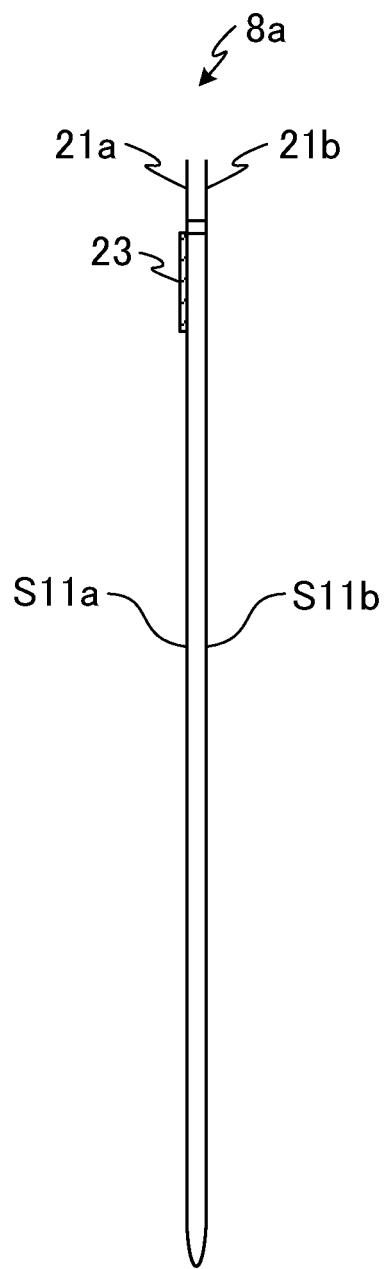
FIG. 4 is a side view of the storage bag with the opening thereof in a closed state.

FIG. 4 is a side view of storage bag 8a with the opening thereof in a closed state. In FIG. 4, components the same as in FIG. 3 are provided with reference numerals the same as in FIG. 3.

Storage bag 8a without any content stored inside is in a shape of a substantially flat surface when the opening at an upper part thereof is closed. As illustrated in FIG. 4, storage bag 8a includes two facing outer surfaces S11a and S11b. In storage bag 8a, attaching portion 21a is provided at the end and on the opening side of outer surface S11a, and attaching portion 21b is provided at a position which is at the end and on the opening side of outer surface S11b, and which faces attaching portion 21a.

Reinforcing member 23 is provided in either one of two outer surfaces S11a and S11b. In FIG. 4, as an example, reinforcing member 23 is provided in outer surface S11a where attaching portion 21a is formed.

Figure 5:
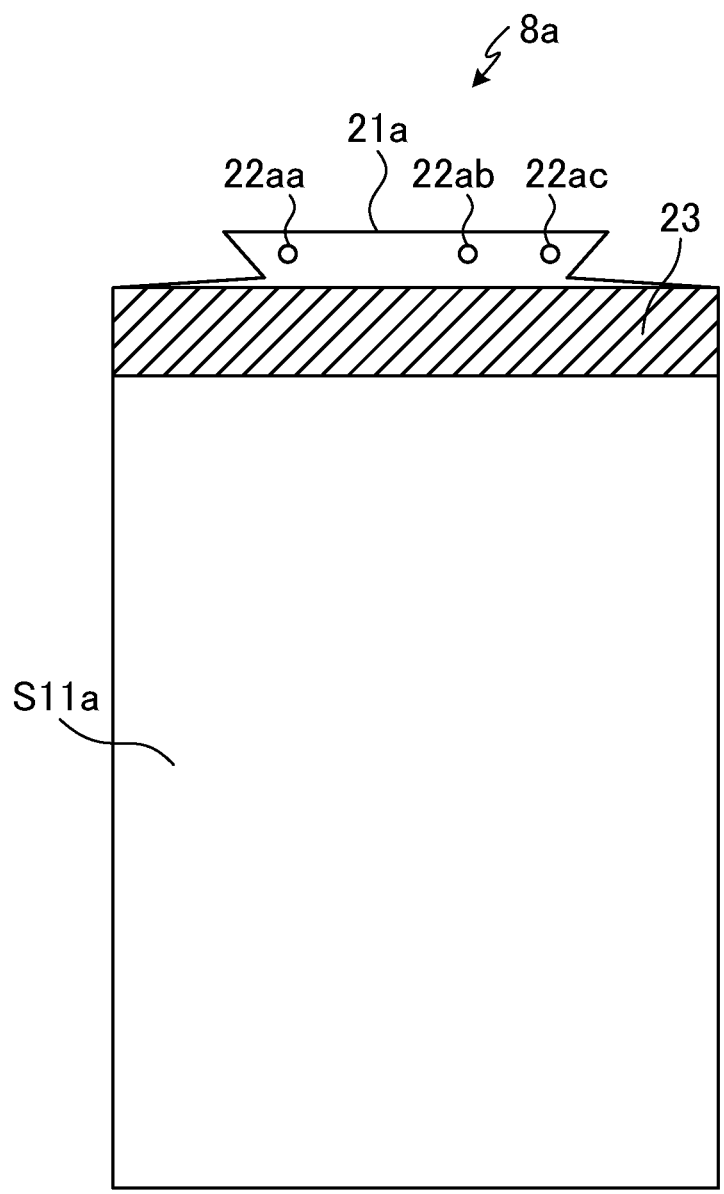
FIG. 5 is a front view of the storage bag with the opening thereof in a closed state.

FIG. 5 is a front view of storage bag 8 with the opening thereof in a closed state. In FIG. 5, components the same as in FIGS. 3 and 4 are provided with reference numerals the same as in FIGS. 3 and 4. As illustrated in FIG. 5, band-shaped reinforcing member 23 is provided across storage bag 8a from one side to the other side of storage bag 8a. No reinforcing member is provided on the rear side of storage bag 8a illustrated in FIG. 5 (surface of storage bag 8a as viewed from the rear side of the drawing in FIG. 5).

Figure 6:
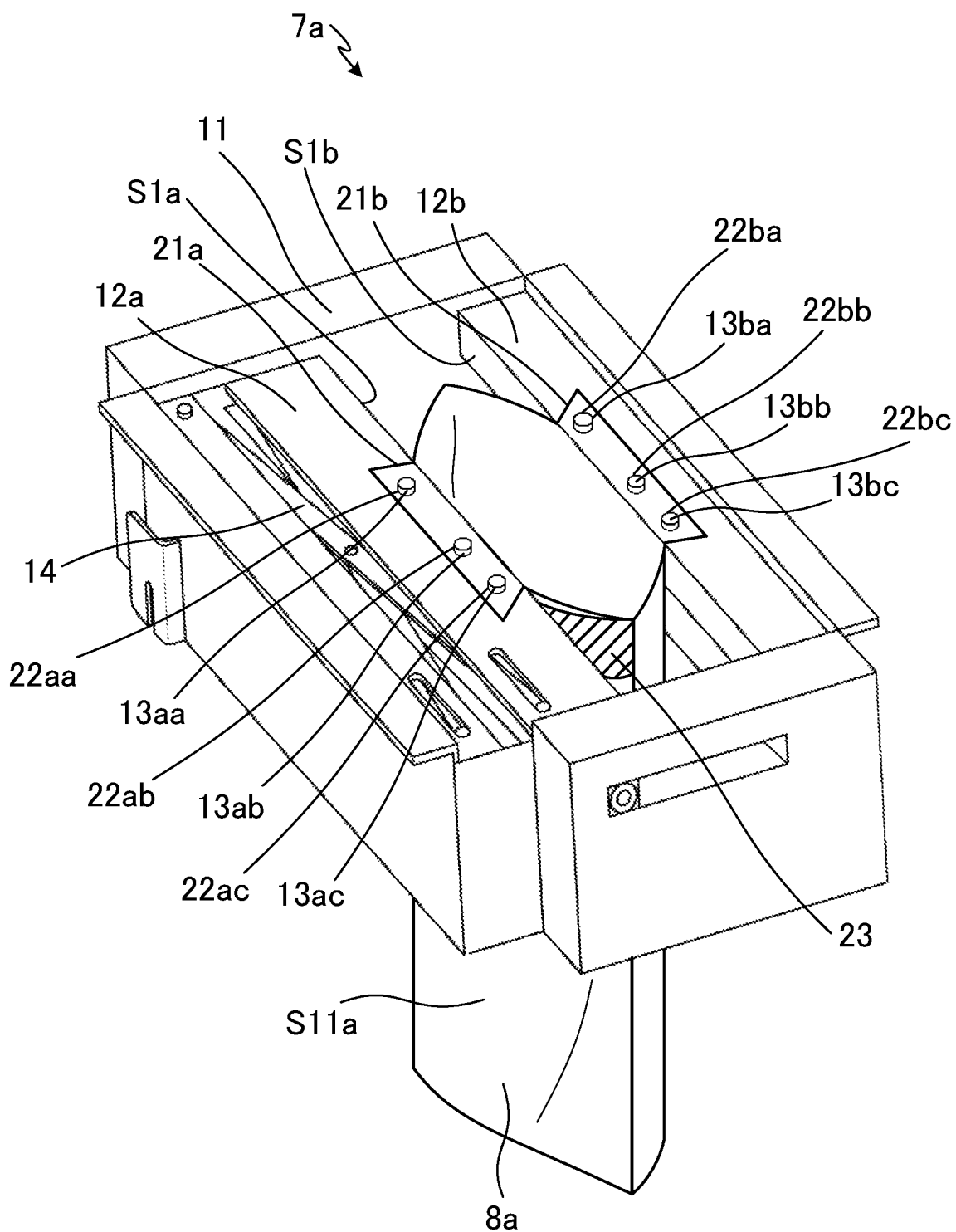
FIG. 6 is a perspective view of the storage bag holding unit with the storage bag suspended therefrom.

FIG. 6 is a perspective view of storage bag holding unit 7a with storage bag 8a suspended therefrom. In FIG. 6, components the same as in FIGS. 2 to 5 are provided with reference numerals the same as in FIGS. 2 to 5.

As illustrated in FIG. 6, holes 22aa to 22ac of storage bag 8a are engaged with pins 13aa to 13ac of holding section 12a, respectively. Holes 22ba to 22bc of storage bag 8a are engaged with pins 13ba to 13bc of holding section 12b, respectively. Engaging the holes of storage bag 8a with the pins of holding sections 12a and 12b in this manner enables storage bag 8a to be suspended from storage bag holding unit 7a as illustrated in FIG. 6.

In the state as illustrated in FIG. 6, the extension of pantograph 14 moves attaching portion 21a of storage bag 8a in a direction toward attaching portion 21b of storage bag 8a. When pantograph 14 is extended fully, a part of storage bag 8a which corresponds to surface S1a of holding section 12a contacts a part of storage bag 8a which corresponds to surface S1b of holding section 12b. Increasing of the temperature of the heating section provided in holding section 12b increases the temperature of surface S1b, thereby heat welding the part of storage bag 8a which corresponds to surface S1b with the part of storage bag 8a which corresponds to surface S1a. The opening of storage bag 8a is thus closed, and banknotes stored in storage bag 8a are enclosed therein.

Pantograph 14 is, for example, extended when a user is to retrieve banknotes stored in storage bag 8a from paper-sheet processing device 1. The extension of pantograph 14 allows for increasing of the heating section in holding section 12b, thereby welding the opening of storage bag 8a with banknotes stored therein. The user then retrieves the banknotes enclosed in storage bag 8a.

Hereinafter, a part below attaching portion 21a of storage bag 8a may also be referred to as a first sealing portion. For example, the part of storage bag 8a which corresponds to surface S1a of holding section 12a may also be referred to as the first sealing portion. Further, a part below attaching portion 21b of storage bag 8a may also be referred to as a second sealing portion. For example, the part of storage bag 8a which corresponds to surface S1b of holding section 12b may also be referred to as the second sealing portion. Reinforcing member 23 is provided in the first sealing portion, i.e., the part of storage bag 8a which corresponds to surface S1a of holding section 12a, as illustrated in FIG. 6.

In the following, a storage bag provided with no reinforcing member 23 will be described.

Figure 7:
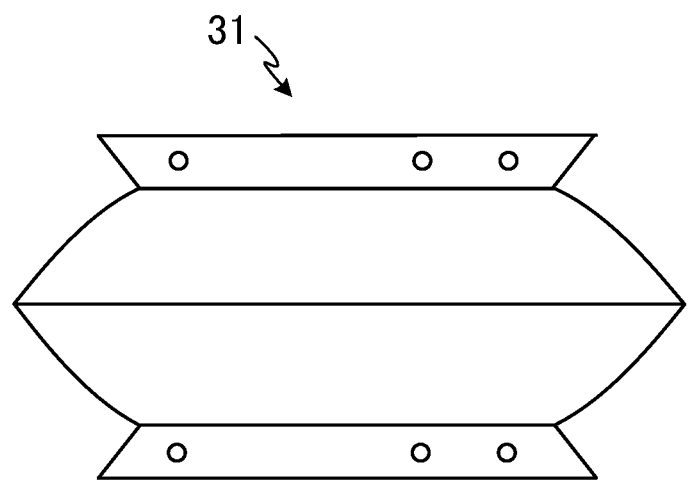
FIG. 7 illustrates a storage bag provided with no reinforcing member as viewed from the opening side.

FIG. 7 illustrates storage bag 31 provided with no reinforcing member 23 as viewed from the opening side. FIG. 7 illustrates storage bag 31 provided with no reinforcing member, which is suspended from storage bag holding unit 7a (whose illustration is omitted in FIG. 7). Illustrated in FIG. 7 is the opening of storage bag 31 as pantograph 14 of storage bag holding unit 7a is retracted.

Figure 8:
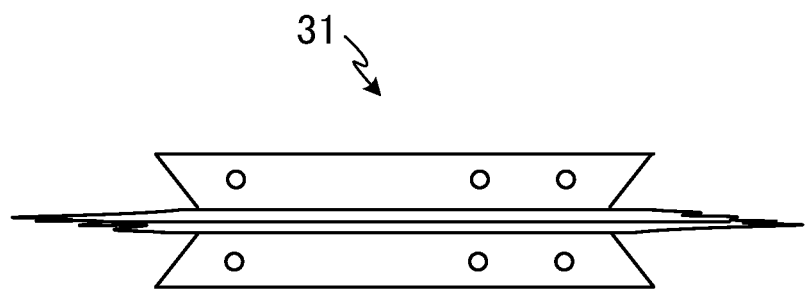
FIG. 8 illustrates the storage bag provided with no reinforcing member as viewed from the opening side.

FIG. 8 illustrates storage bag 31 provided with no reinforcing member 23 as viewed from the opening side. Illustrated in FIG. 8 is the opening of storage bag 31 as pantograph 14 of storage bag holding unit 7a is extended.

When storage bag 31 is not provided with reinforcing member 23, the extension of pantograph 14 may close the opening of storage bag 31 in a wrinkled state. In a case where a storage bag is formed from, for example, a soft and thin material, the opening thereof is closed in a wrinkled state, as illustrated in FIG. 8.

Heat welding of the opening of storage bag 31, which is closed in a wrinkled state may cause a seal failure. Storage bag 8a illustrated in FIG. 3, meanwhile, is provided with reinforcing member 23 in the first sealing portion, and thus wrinkling of the opening of storage bag 8a is suppressed.

Figure 9:
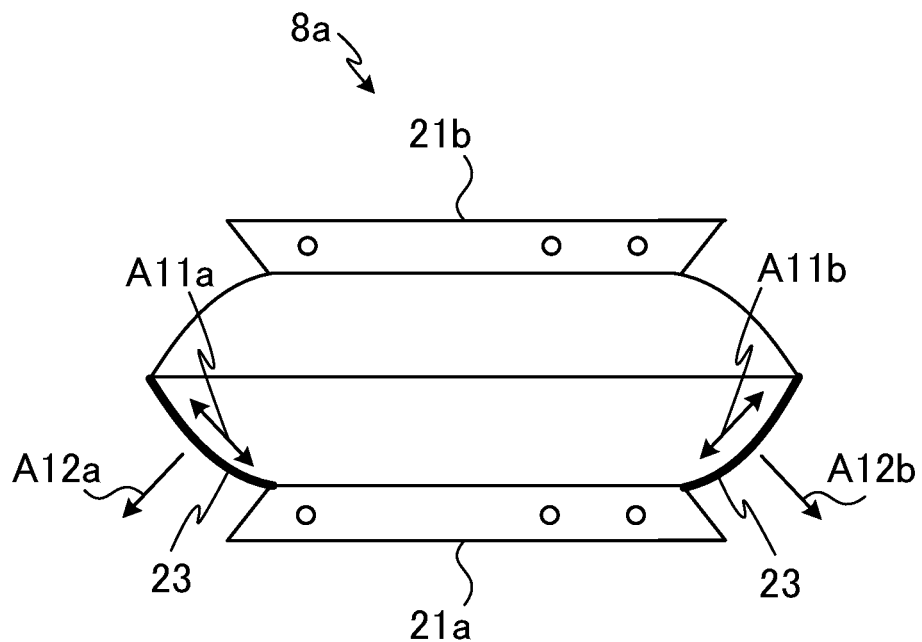
FIG. 9 illustrates a storage bag provided with a reinforcing member as viewed from the opening side.

FIG. 9 illustrates storage bag 8a provided with reinforcing member 23 as viewed from the opening side. FIG. 9 illustrates storage bag 8a suspended from storage bag holding unit 7a (whose illustration is omitted in FIG. 9). Illustrated in FIG. 9 is the opening of storage bag 8a as pantograph 14 of storage bag holding unit 7a is retracted. In FIG. 9, components the same as in FIG. 3 are provided with reference numerals the same as in FIG. 3.

The first sealing portion of storage bag 8a is provided with reinforcing member 23. Reinforcing member 23, as described above, suppresses wrinkling of the opening of storage bag 8a.

For example, reinforcing member 23 applies tension to the first sealing portion so as to extend the first sealing portion in the longitudinal direction thereof, as shown by double-headed arrows A11a and A11b in FIG. 9. Wrinkling of the opening of storage bag 8a is thus suppressed. Reinforcing member 23 has rigidity against bending higher than storage bag 8a has, and thus also applies force to the first sealing portion so as to suppress curvature in a direction perpendicular to the longitudinal direction of the first sealing portion. For example, reinforcing member 23 applies force to the first sealing portion in a direction to suppress curvature of the first sealing portion, as shown by arrows A12a and A12b in FIG. 9. Accordingly, wrinkling of the opening of storage bag 8a is suppressed as compared to the case where reinforcing member 23 is not provided.

Reinforcing member 23 may have either one of functions of applying tension so as to extend the first sealing portion in the longitudinal direction thereof, and of exerting force so as to suppress curvature. As a matter of course, reinforcing member 23 may have both of the functions of applying tension so as to extend the first sealing portion in the longitudinal direction thereof, and of exerting force so as to suppress curvature.

Figure 10:
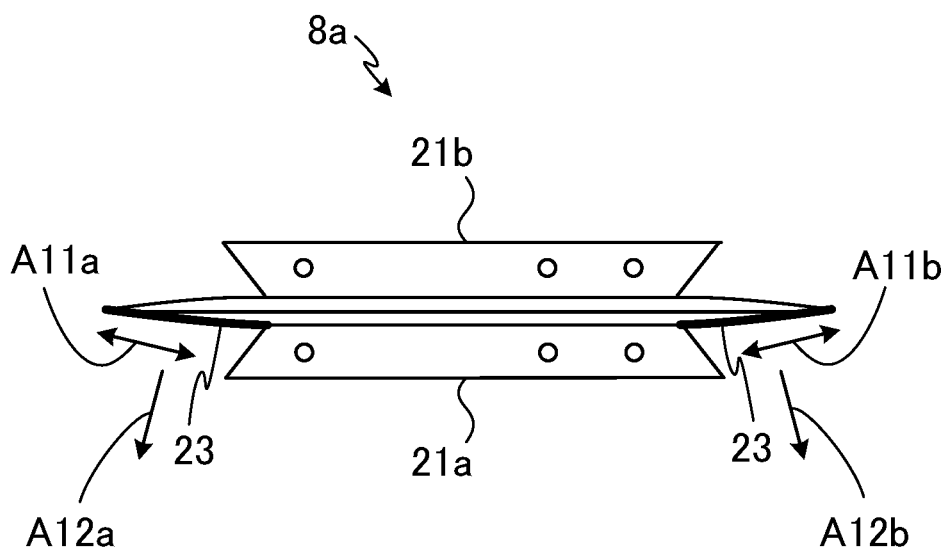
FIG. 10 illustrates the storage bag provided with the reinforcing member as viewed from the opening side.

FIG. 10 illustrates storage bag 8a provided with reinforcing member 23 as viewed from the opening side. Illustrated in FIG. 10 is the opening of storage bag 8a as pantograph 14 of storage bag holding unit 7a is extended. In FIG. 10, components the same as in FIG. 9 are provided with reference numerals the same as in FIG. 9.

The extension of pantograph 14 brings the first sealing portion in contact with the second sealing portion. Reinforcing member 23 exerts force on the first sealing portion in the directions of double-headed arrows A11a and A11b in FIG. 10. Reinforcing member 23 also exerts force on the first sealing portion in the directions of arrows A12a and A12b in FIG. 10. Therefore, the first sealing portion is extended in the longitudinal direction thereof even when holding section 12a moves toward holding section 12b in storage bag holding unit 7a, thereby suppressing wrinkling. This enables prevention of a seal failure in storage bag 8a.

In the following, attachment of storage bag 8a to storage bag holding unit 7a will be described. In storage bag 8a, providing reinforcing member 23 in either one of the first and second sealing portions limits the attachment direction of storage bag 8a to storage bag holding unit 7a. For example, for storage bag 8a with reinforcing member 23 provided in the first sealing portion, attachment to storage bag holding unit 7a is limited so that the first sealing portion is on the holding section 12a side, and the second sealing portion is on the holding section 12b side.

If storage bag 8a is attached to storage bag holding unit 7a in a manner such that the first sealing portion is on the holding section 12b side, and the second sealing portion is on the holding section 12b, it may cause a seal failure. For example, when reinforcing member 23 has low thermal conductivity, attachment of the first sealing portion provided with reinforcing member 23 to holding section 12 side, which has a heating section, may cause a seal failure due to lack of obtainment of a temperature sufficient for heat welding. Accordingly, storage bag 8a and storage bag holding unit 7a have configurations for preventing a mistake in the attachment direction of storage bag 8a to storage bag holding unit 7a.

For example, in storage bag 8a illustrated FIG. 3, the positions of holes 22aa to 22ac of attaching portion 21a are different from the positions of respective corresponding holes 22ba to 22bc of attaching portion 21b. For example, holes 22aa to 22ac do not coincide with holes 22ba to 22bc when storage bag 8a is rotated by 180° so that attaching portion 21a illustrated in FIG. 3 comes to the position of portion 21b illustrated in FIG. 3. In a similar manner, the positions of pins 13aa to 13ac of holding section 12a are different from the positions of respective corresponding pins 13ba to 13bc of holding section 12b in storage bag holding unit 7 illustrated in FIG. 2.

Therefore, when trying to attach attaching portion 21a including holes 22aa to 22ac to holding section 12b including pins 13ba to 13bc in storage bag holding unit 7a, and attaching portion 21b including holes 22ba to 22bc to holding section 12a including pins 13aa to 13ac in storage bag holding unit 7a, storage bag 8a cannot be attached to storage bag holding unit 7a due to incorrect fitting in positions between holes and pins. The above configuration enables prevention of a mistake in the attachment direction of storage bag 8a to storage bag holding unit 7a.

As described above, storage bag 8a includes attaching portion 21a provided at the end and on the opening side of storage bag 8a, and to be attached to holding section 12a; and attaching portion 21b provided at a position which is at the end and on the opening side of storage bag 8a and which faces attaching portion 21a, and to be attached to holding section 12b. Storage bag 8a further includes a first sealing portion provided at a position below attaching portion 21a when suspended from holding sections 12a and 12b; and a second sealing portion which is provided at a position below attaching portion 21b when suspended from holding sections 12a and 12b, and which seals the opening of storage bag 8a by being joined with the first sealing portion. Storage bag 8 also includes reinforcing member 23 provided in either one of the first and second sealing portions. The above configuration enables prevention of a seal failure in storage bag 8a.

For preventing a mistake in the attachment direction of storage bag 8a to storage bag holding unit 7a, described in the above is a configuration in which attaching portions 21a and 21b have holes 22aa to 22ac and corresponding holes 22ba to 22bc in different positions, respectively. However, for preventing such a mistake, any other configuration may be employed. For example, in storage bag 8a, attaching portions 21a and 21b may have different shapes, respectively. Specifically, either one of attaching portions 21a and 21b may be round-edged. Further, in storage bag holding unit 7a, holding sections 12a and 12b may have different shapes, respectively. For example, holding sections 12a and 12b in storage bag holding unit 7a may have grooves copied from attaching portions 21a and 21b (which have different shapes, respectively) in storage bag 8a, respectively. The above configuration enables prevention of a mistake in the attachment direction of storage bag 8a to storage bag holding unit 7a by attaching of attaching portions 21a and 21b in storage bag 8a so as to fit the copied grooves of holding sections 12a and 12b in storage bag holding unit 7a.

Further, in storage bag 8a, attaching portions 21a and 21b may have different numbers of holes. Holding sections 12a and 12b in storage bag holding unit 7a may have different numbers of pins in accordance with the respective numbers of holes of attaching portions 21a and 21b in storage bag 8a.

Further, in storage bag 8a, attaching portions 21a and 21b may have holes in different shapes. For example, the hole shape in attaching portion 21a is circular, and the hole shape in attaching portion 21b is square. Holding sections 12a and 12b in storage bag holding unit 7a may have pins in different shapes in accordance with the respective hole shapes in attaching portions 21a and 21b in storage bag 8a.

Attaching portions 21a and 21b in storage bag 8a may be different each other in appearance. For example, attaching portions 21a and 21b may have different colors, characters, drawings or marks. Holding sections 12a and 12b in storage bag holding unit 7a may be different each other in appearance in accordance with the appearances of attaching portions 21a and 21b in storage bag 8a.

When reinforcing member 23 has high thermal conductivity, storage bag 8a may be attached to storage bag holding unit 7a so that reinforcing member 23 is on the heating section side (holding section 12b side). Reinforcing member 23 may be provided in both of holding sections 12a and 12b.

The heating section may be provided in holding section 12a.

Second Embodiment

In the first embodiment, reinforcing member 23 is provided across storage bag 8a from one side to the other side of storage bag 8a (refer to FIG. 5). In the second embodiment, the reinforcing member is provided in a part of the first sealing portion.

Figure 11:
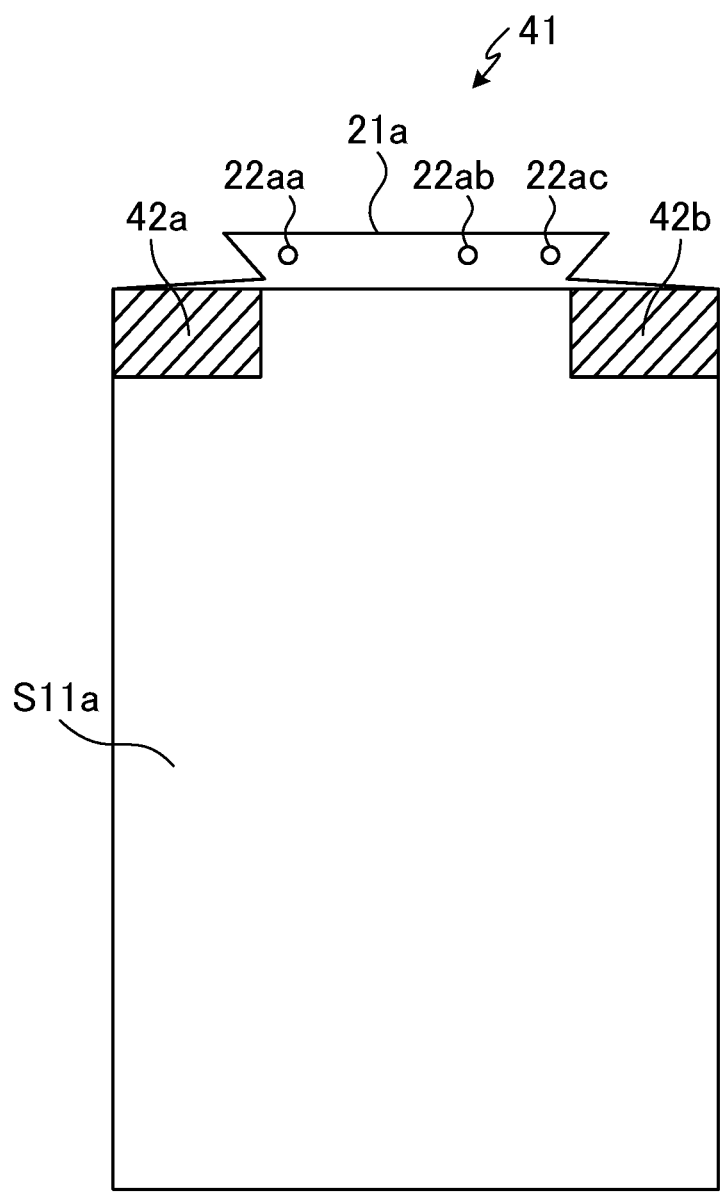
FIG. 11 is a front view of a storage bag according to a second embodiment.

FIG. 11 is a front view of a storage bag according to the second embodiment. In FIG. 11, components the same as in FIG. 5 are provided with reference numerals the same as in FIG. 5. As illustrated in FIG. 11, storage bag 41 includes reinforcing members 42a and 42b.

Reinforcing members 42a and 42b are provided to be spaced apart from each other in the first sealing portion of outer surface S11a in storage bag 41. Each of reinforcing members 42a and 42b is provided to be in contact with each side of storage bag 41. Reinforcing members 42a and 42b are provided in the opening of storage bag 41 in parts which do not contact holding section 12a or 12b in storage bag holding unit 7a when storage bag 41 is suspended from storage bag holding unit 7a.

Reinforcing members 42a and 42b are, for example, made of polyethyleneterephthalate as reinforcing member 23. Each of reinforcing members 42a and 42b applies tension so as to extend the first sealing portion in the longitudinal direction thereof. Each of reinforcing members 42a and 42b also applies force to the first sealing portion so as to suppress curvature therein. Wrinkling in the first sealing portion of storage bag 41 is thus suppressed.

As described above, reinforcing members 42a and 42b are provided in the first sealing portion in parts corresponding to the parts of the opening, which do not contact holding section 12a or 12b when storage bag 41 is suspended from storage bag holding unit 7a. The above configuration enables prevention of a seal failure.

Third Embodiment

In the third embodiment, a crease is provided or a bead is molded on reinforcing member 23.

Figure 12:
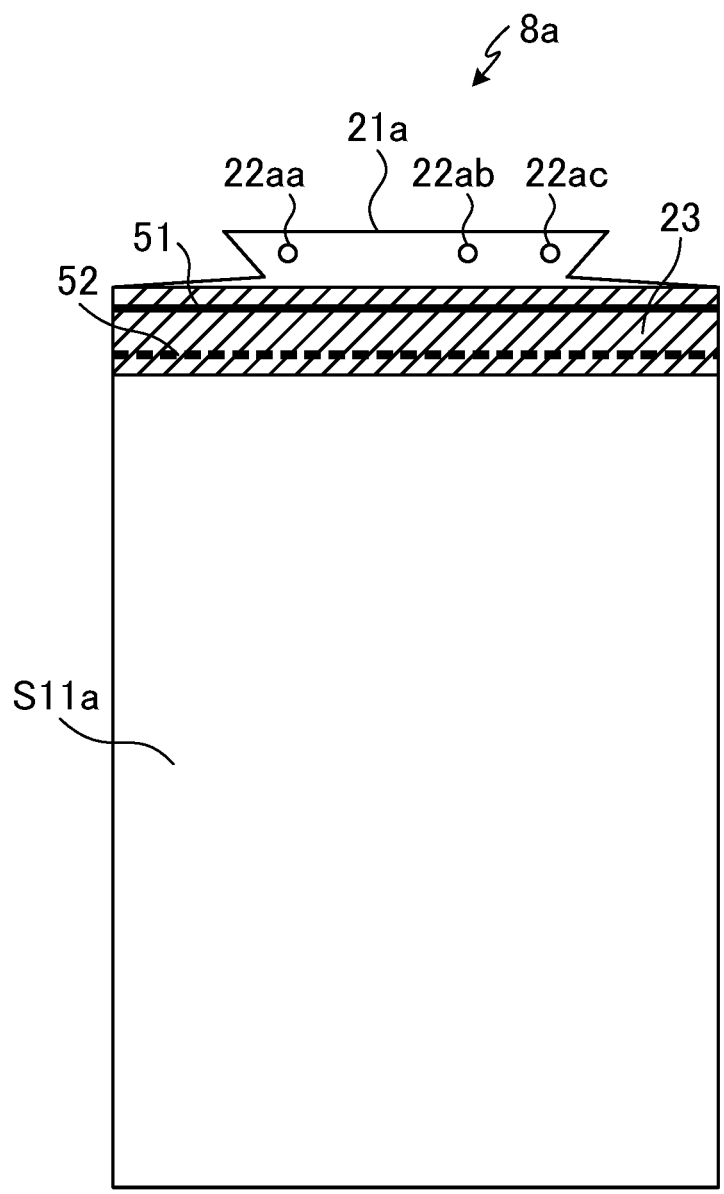
FIG. 12 is a front view of a storage bag according to a third embodiment.

FIG. 12 is a front view of storage bag 8a according to the third embodiment. In FIG. 12, components the same as in FIG. 5 are provided with reference numerals the same as in FIG. 5.

As illustrated in FIG. 12, crease 51 and bead 52 are formed on reinforcing member 23 in storage bag 8a. This configuration enables reinforcing member 23 to become stiffer to further extent.

Both crease 51 and bead 52 are formed in the above described reinforcing member 23, however, only one of these two may be formed.

Creases 51 may be formed crosswise on reinforcing member 23. Beads 52 may be formed crosswise on reinforcing member 23. Crease 51 and bead 52 may be formed crosswise on reinforcing member 23.

Other than crease 51 and bead 52, a metal wire may be embedded in or adhered on reinforcing member 23.

Due to difference in materials, reinforcing member 23 and storage bag 8a may have different expansion rates and contraction rates by a temperature change. For example, in a place with a low air temperature, storage bag 8a may contract more than reinforcing member 23 does, and in a place with a high air temperature, storage bag 8a may expand more than reinforcing member 23 does. When reinforcing member 23 adheres to storage bag 8a, reinforcing member 23 may be wrinkled as it is pulled by expansion/contraction of storage bag 8a.

Providing crease 51 on reinforcing member 23 enables reinforcing member 23 to become stiffer to further extent, and thus more resistant to pulling of expansion/contraction of storage bag 8a. The above configuration thus enables prevention of a seal failure in storage bag 8a.

This application is entitled to and claims the benefit of Japanese Patent Application No. 2017-038714 filed on Mar. 1, 2017, the disclosure of which including the specification, drawings and abstract is incorporated herein by reference in its entirety.

REFERENCE SIGNS LIST

1 Paper-sheet processing device
7a, 7b Storage bag holding unit
8a, 8b, 41 Storage bag
11 Frame
12a, 12b Holding section
13aa to 13ac, 13ba to 13bc Pin
21a, 21b Attaching portion
22aa to 22ac, 22ba to 22bc Hole
23, 42a, 42b Reinforcing member
51 Crease
52 Bead

The invention claimed is:

1. A storage bag configured to be attached to a first holding section and a second holding section of a sheet processing device for storing a sheet into the storage bag, the storage bag including an opening at an end portion of the storage bag, the storage bag comprising:
a body portion for storing the sheet therein through the opening;
a first attaching portion which is configured to be attached to the first holding section and not to be attached to the second holding section, the first attaching portion which is provided at one side of the end portion of the storage bag and next to the body portion;
a second attaching portion which is configured to be attached to the second holding section and not to be attached to the first holding section, the second attaching portion which is provided at another side of the end portion of the storage bag and next to the body portion, and faces the first attaching portion;
a first sealing portion being a first part of the body portion, the first part provided next to the first attaching portion;
a second sealing portion being a second part of the body portion, the second part provided next to the second attaching portion; and
a reinforcing member only provided at an outer side surface of the first sealing portion, wherein:
the first sealing portion and the second sealing portion are contacted together and are welded when the opening is heat sealed with a heating section provided at the second holding section.

2. The storage bag according to claim 1, wherein:
the reinforcing member is band-shaped or rod-shaped, and
the reinforcing member is configured to apply tension in a longitudinal direction of the first sealing portion.

3. The storage bag according to claim 1, wherein:
the reinforcing member is band-shaped or rod-shaped, and
the reinforcing member is configured to apply force to suppress curvature in a direction perpendicular to a longitudinal direction of the first sealing portion.

4. The storage bag according to claim 1, wherein:
the first attaching portion and the second attaching portion have shapes different from each other.

5. The storage bag according to claim 1, wherein:
the first attaching portion and the second attaching portion each have different numbers of holes.

6. The storage bag according to claim 1, wherein:
the first attaching portion and the second attaching portion have holes, and
the positions of the holes of the first attaching portion are different from the positions of the holes of the second attaching portion.

7. The storage bag according to claim 1, wherein:
the first attaching portion and the second attaching portion have holes, and
the shape of the holes of the first attaching portion are different from the shape of the holes of the second attaching portion.

8. The storage bag according to claim 1, wherein:
the first attaching portion and the second attaching portion are different from each other in appearance.

9. The storage bag according to claim 1, wherein:
the reinforcing member and the body portion of the storage bag are made of different materials and
the first sealing portion, the second sealing portion, and the body portion are made of a same material.

10. The storage bag according to claim 9, wherein:
the reinforcing member is made of polyethylene terephthalate, and the body portion of the storage bag is made of polyethylene.

11. A storage bag configured to be attached to a first holding section and a second holding section of a sheet processing device for storing a sheet into the storage bag, the storage bag including an opening at an end portion of the storage bag, the storage bag comprising:
a body portion for storing the sheet therein through the opening;
a first attaching portion which is configured to be attached to the first holding section and not to be attached to the second holding section, the first attaching portion which is provided at one side of the end portion of the storage bag and next to the body portion;
a second attaching portion which is configured to be attached to the second holding section and not to be attached to the first holding section, the second attaching portion which is provided at another side of the end portion of the storage bag and next to the body portion, and faces the first attaching portion;

a first sealing portion being a first part of the body portion, the first part provided next to the first attaching portion; and a second sealing portion being a second part of the body portion, the second part provided next to the second attaching portion, wherein the first sealing portion and the second sealing portion are contacted together and are welded when the opening is heat sealed with a heating section provided at the second holding section.

12. The storage bag according to claim 11, further comprising:
a reinforcing member only provided at an outer side surface of the first sealing portion.

13. The storage bag according to claim 12, wherein:
the reinforcing member and the body portion of the storage bag are made of different materials and
the first sealing portion, the second sealing portion, and the body portion are made of a same material.

14. The storage bag according to claim 13, wherein:
the reinforcing member is made of polyethylene terephthalate, and
the body portion of the storage bag is made of polyethylene.

15. The storage bag according to claim 11, wherein:
the first attaching portion and the second attaching portion have shapes different from each other.

16. The storage bag according to claim 11, wherein:
the first attaching portion and the second attaching portion each have different numbers of holes.

17. The storage bag according to claim 11, wherein:
the first attaching portion and the second attaching portion have holes, and
the positions of the holes of the first attaching portion are different from the positions of the holes of the second attaching portion.

18. The storage bag according to claim 11, wherein:
the first attaching portion and the second attaching portion have holes, and
the shape of the holes of the first attaching portion are different from the shape of the holes of the second attaching portion.

19. The storage bag according to claim 11, wherein:
the first attaching portion and the second attaching portion are different from each other in appearance.

* * * * *